Figure 3:
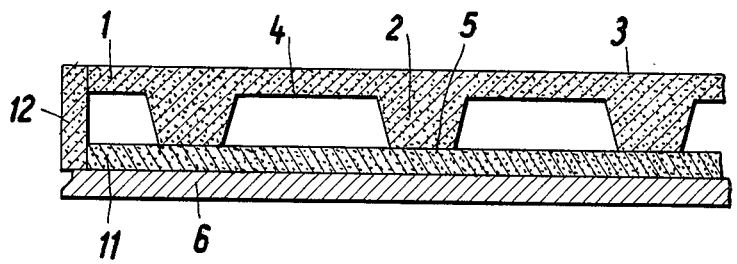

Feb. 1, 1966  H. SELIG ETAL  3,232,673
PNEUMATIC CONVEYING, STORING AND/OR MIXING APPARATUS
Filed Jan. 16, 1964  4 Sheets-Sheet 1
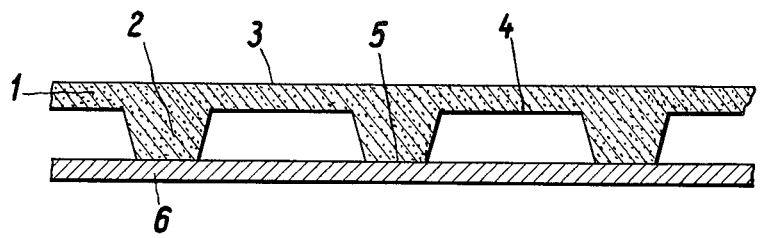
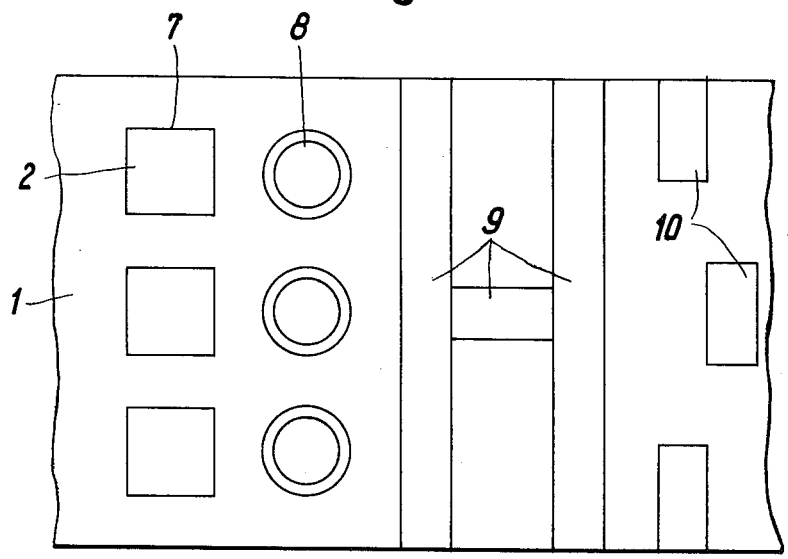
Inventors
Hans Selig
Friedrich Schievenedel
By Cushman, Darby & Cushman
Attorneys Feb. 1, 1966  H. SELIG ETAL  3,232,673
PNEUMATIC CONVEYING, STORING AND/OR MIXING APPARATUS
Filed Jan. 16, 1964  4 Sheets-Sheet 3
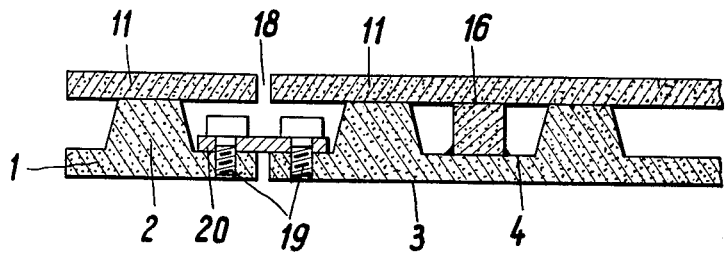
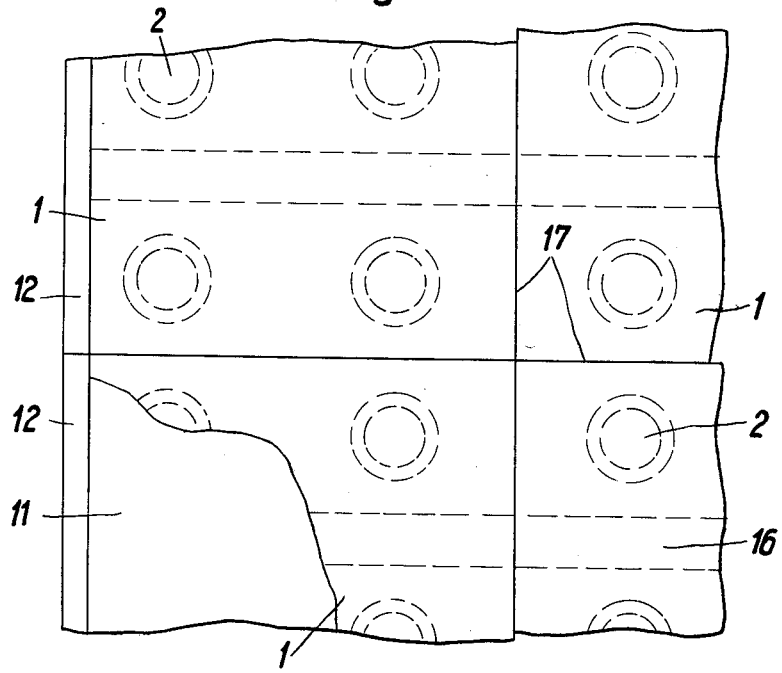
Inventors
Hans Selig
Friedrich Schlemedel
By Cushman, Darby & Cushman
Attorneys

United States Patent Office 3,232,673
Patented Feb. 1, 1966

3,232,673
PNEUMATIC CONVEYING, STORING AND/OR
MIXING APPARATUS
Hans Selig, Dortmund-Horde, and Friedrich Schievenedel, Dortmund-Aplerbeck, Germany, assignors to Deutsche Edelstahlwerke Aktiengesellschaft, Krefeld, Germany
Filed Jan. 16, 1964, Ser. No. 338,161
Claims priority, application Germany, Jan. 16, 1963,
D 40,696
9 Claims. (Cl. 302—29)

The present invention relates to a blowing floor in connection with a holder in a pneumatic conveying, storing or mixing system.

It is known to convey bulk materials pneumatically, to loosen them up pneumatically in storage bins, to discharge silos pneumatically and also pneumatically to unload dusty and granular bulk materials from rail or road vehicles.

In such equipment the floors of conveying troughs, silos, bins and the like consist more particularly of porous sintered metal (i.e., sintered powdered metal) plates or porous sintered plastic (i.e., sintered powdered plastic) plates which have widely replaced the formerly used floors which consisted of stretched fabric panels or ceramic plates. The reference to a porous sintered metal or plastic plate obviously refers to a powdered plastic or metal material which is sintered to form a porous plate. A sintered plate is one in which particles, such as powdered plastic or metal, are fused together by heat to form a structure porous to air or other gases. The provision of such floors is not a simple task and they usually require the provision of supporting structures for instance in the form of grids to which the plates are individually bolted or struck. Difficulties also often arise because screw fastenings work loose and nuts or bolts from a silo or the like may then be carried into machinery in which the bulk materials are further processed. The supporting structures must be a fairly close grid because otherwise, particularly in large containers, the weight of the material may be excessive and cause the plates to bend under the load. The use of close mesh supporting structures also has the drawback that at points where girders or other supporting elements are located under the floor the materials tend to lodge and remain behind when containers or silos are emptied.

It is the object of the present invention so to develop the known type of porous sintered plate-like blowing floors that the provision of support means in the form of special girders or the like can be dispensed with, whilst at the same time making the floors sufficiently thin to avoid unduly high pressure loss.

The invention therefore proposes a blowing floor for pneumatic conveying, storage and mixing plant, consisting of at least one porous sintered plate for use in conveying troughs, containers, bins, silos, hoppers or the like, wherein one face of at least one porous plate is provided with porous boss—or web-like projections sintered on to the plate to serve as a support and reinforcement. A blowing floor according to the invention may therefore consist of a porous plate formed on one face with porous projections which have been sintered on to the same. The face of the plate provided with the boss or web-like projections is then placed against the container wall, whereas the flat side of the plate faces the blown material. A cavity is thus formed between the plate and the floor for the introduction thereinto of air or a gas which then rises in even distribution into the bulk material on the plates. Since the porosity of the projections is the same as that of the floor itself, the loosening air can blow through them unhindered and at these points the loosening effect is therefore the same as elsewhere, although the projections provide the floor with the required points of support and stability. The plates are secured to the bottom of the container by adhesively bonding the ends of the projections thereto.

Another possibility afforded by the invention consists in creating a floor by the provision of two preferably plastic plates which are interconnected by boss- or web-like projections and of which at least the plate facing the blown bulk material is porous. In such an arrangement both plates may be formed with boss-like projections although it is preferred that only one of the plates should be so formed and the plates bonded together at the ends of the projections by means of an adhesive.

When plates are sintered it is generally found that one face of the plates is smoother than the other. Since it is desirable that the side facing the blown material should be as smooth as possible it is advisable in the construction of a blowing floor consisting of two plates according to the invention to provide one of the plates with projections and to combine it with a plate which is flat on both sides. In such an arrangement the flat face of the plate formed with the projections can then be placed against the bottom of the container and the rougher face of the second plate placed on to and bonded, for instance adhesively, to the ends of the projections on the first plate.

It is also within the scope of the invention to provide a blowing floor with an external face which is curved or profiled in any desirable way.

For containers of irregular shape it is advisable to divide the blowing floor into several units. According to the invention several structural units constructed as has been described may be placed side by side and welded, adhesively bonded or bolted together with straps.

In particular cases, particularly in large sized containers, it may be desirable to guide the air or gas stream in particular directions. According to the invention it is therefore proposed to provide the structural units with web members which are non-porous, or which have a reduced degree of porosity, in order to divide up the air or gas stream. It will be appreciated that the projections or web members could also have an increased degree of porosity with respect to the porosity of the plate.

In the majority of applications it should be sufficient simply to place the blowing floor loosely on to the container wall. Nevertheless the blowing floor may be specially secured to the wall by an adhesive, or by means of pins, screws, nuts, adhesion magnets or the like which are embedded therein.

When providing a cylindrical or like sectioned tank with a blowing floor the invention proposes that such a floor should extend around about half the inside periphery of the tank and up the sides to roughly the horizontal axial centre plane.

The construction of a blowing floor according to the invention will be more particularly described by reference to the accompanying drawings.

FIGURE 1 is a cross section of a porous blowing floor 1 according to the invention, which has one face 4 formed with sintered porous projections 2, such as sintered powdered plastic or metal. These projections 2 rest on the container wall and the ends 5 of the projections are secured to the container wall 6 for instance by means of an adhesive. The flat side 3 of the floor 1 faces the material that is to be blown and conveyed.

FIGURE 2 is a plan view of a porous blowing floor according to the invention, in which the sintered porous projections have a square or rectangular section, as indicated at 7. Alternatively their sections may be cylindrical or their shape may be that of truncated cones, as indicated at 8. Nevertheless, according to the invention, there is no objection to the projections having the form of webs 9 or 10.

Another embodiment of a blowing floor according to the invention is illustrated in section in FIGURE 3. A porous plate 1 is formed with truncated-cone-shaped projections 2 of which the end faces 5 are bonded to a second plate 11 placed against a wall 6 of a container. At the edges the two plates 1 and 11 may be connected by likewise porous end plates 12. In the blowing floor illustratively shown in FIGURE 3 it is by no means necessary that the baseplate 11 should also be porous.

Figure 4:
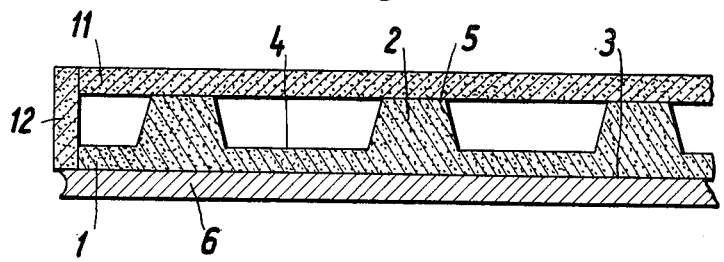

In the embodiment shown in FIGURE 4 of a blowing floor according to the invention a porous plate 1 provided with boss-like or web-like projections 2 is placed with its flat face against a wall 6 of a container. A flat plate 11 which in this embodiment must be porous is bonded to the end faces 5 of the projections 2 of plate 1. This arrangement in FIGURE 4 would be the most convenient in applications of a blowing floor according to the invention because it permits the smoothest face of the porous plate 11 to be placed so that it contacts the blown material, whereas the rougher face can be bonded to the ends 5 of the projections 2 of the baseplate 1.

It is also within the scope of the invention (see FIGURE 5) to sinter bolts 13, 14, adhesion magnets 15 or like securing devices into the porous plate 1.

A blowing floor according to the invention may consist of a plurality of separate structure units which may be placed side by side or connected together in any convenient manner.

FIGURE 6 shows a blowing floor in section which is formed by connecting together several abutting floor elements. The butt ends 18 of the structural elements may be bonded together by welding or by means of a strap 20 secured by bolts or screws 19.

FIGURE 7 is a plan view of part of a blowing floor built up from structural units constructed as proposed by the present invention. The boss-like porous projections sintered on to baseplate 1 are represented at 2. For dividing the air or gas streams slightly porous webs 16 are sintered or welded in position between the plates 1 and 11. Along the joints 17 the individual structural elements are bonded together for instance adhesively or by fusion to form the complete floor. End plates 12 may again be provided along the floor edges.

Figure 8:
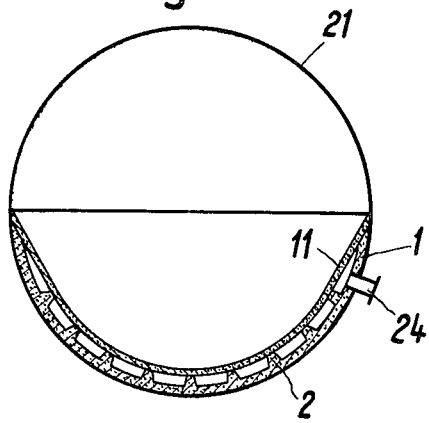
Figure 9:
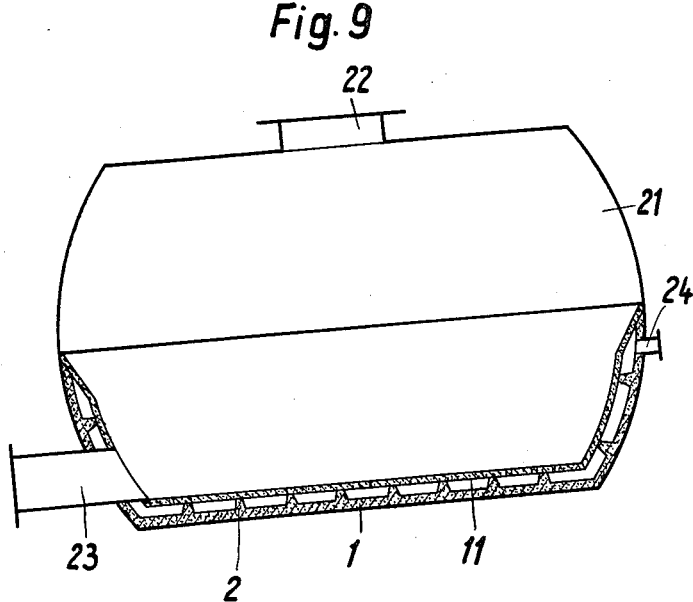

The use of a blowing floor according to the invention in a cylindrical container is illustratively shown in FIGURES 8 and 9. The cylindrical tank 21 is provided in conventional manner with an inlet opening 22 and an outlet 23. The blowing floor which extends roughly half way around the inside periphery and up to approximately a horizontal median plane at each end serves for blowing air or a gas into the material and thereby discharging it from the tank. The floor is preferably built up of individual structural elements which are interconnected in the manner already described. In the illustrated example the porous plate provided with truncated-cone-shaped projections 2 formed on to the same by sintering is placed into direct contact with the tank wall whereas the second porous plate 11 rests on the ends of the porous projections 2 to which it is adhesively bonded or welded. While the plate shown in FIGURES 8 and 9 is curved, it is obvious that the plate could take other configurations conforming to the shape of the container with which it is associated. Accordingly, it is appreciated that reference to a "porous plate" does not necessarily mean a porous "flat" plate.

At one or more points of the tank, as indicated at 24, connections may be provided for the admission of compressed air or of a pressurised gas for pneumatically discharging the bulk material.

Figure 5:
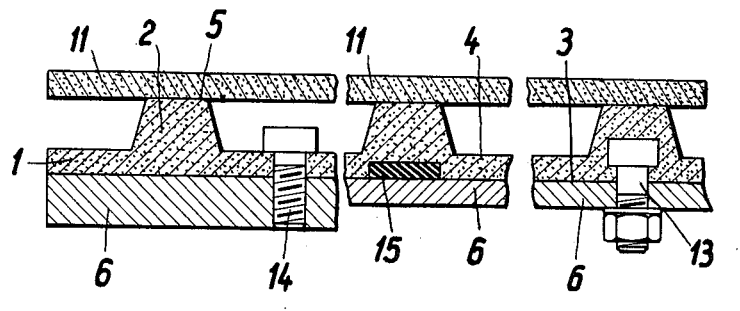

In a tank thus equipped substantially the entire cross section is available for loading material since the space occupied by the structural elements for blowing in a gas or air is practically negligible. The weight of the loaded material is evenly distributed over the entire container wall. Supporting structures need not be welded or riveted into the same. Moreover, the blowing floor is insertable into the tank in a particularly convenient way without requiring special fixing means for securing it to the tank walls. If it is thought that in mobile or portable equipment the blowing floor might shift as a result of vibration, no difficulty will be experienced in adhesively securing, welding, or, as shown in FIGURE 5, mechanically or magnetically fixing the floor to the wall. As seen from FIGURES 1, 3–6, 8 and 9, the projections are at least equal in depth to the thickness of the sintered porous plate to which they are attached and at least equal in depth to the thickness of the sintered porous plate adjacent to the material being pneumatically displaced. In most instances the latter defined plate is the same as the first plate, the distinction becoming important in reference to a floor comprising a pair of plates. Furthermore, as seen from FIGURE 7, the area of the face of the porous plate 1 covered by the porous projections is less than one-half of the area of the face of the plate leaving the major area of the face exposed for direct passage of a pneumatic medium therethrough.

What we claim is:

1. A blowing floor adapted to have a pneumatic medium blown therethrough and to be used in an apparatus for conveying, mixing or otherwise displacing material pneumatically comprising:

a porous plate of sintered powdered material; and a plurality of porous projections sintered on one face of the plate and serving as support and reinforcement for the plate, the projections being of a depth at least equal to the thickness of the porous plate.

2. The blowing floor defined in claim 1 in which the porous projections comprise powdered sintered material.

3. The blowing floor defined in claim 1 in which the porous projections are of a depth exceeding the thickness of the plate.

4. The blowing floor defined in claim 1 in which the porous plate is curved.

5. The blowing floor defined in claim 1 in which the projections have an annular cross-sectional configuration.

6. The blowing floor defined in claim 1 in which the projections comprise frusto-conical studs, the larger base of which is sintered to the porous plate so that the sides of the studs converge towards their free ends.

7. The blowing floor defined in claim 1 in which the area of the face of the porous plate covered by the porous projections is less than one-half of the area of the face of the plate leaving the major area of the face exposed for direct passage of a pneumatic medium threrethrough.

8. A blowing floor adapted to have a pneumatic medium blown therethrough and to be used in an apparatus for conveying, mixing or otherwise displacing material pneumatically comprising:

a pair of plates disposed in a spaced relationship from each other, at least the plate adjacent to the material to be pneumatically displaced comprising porous sintered powdered material; and a plurality of porous projections sintered to one of the plates and bridging the two plates, the projections being of a depth at least equal to the thickness of the plate adjacent to the material to be pneumatically displaced.

9. The blowing floor defined in claim 8 in which the porous projections are of a depth exceeding the thickness of the plate adjacent to the material to be pneumatically displaced.

References Cited by the Examiner

UNITED STATES PATENTS 2,565,835   8/1951   Adams _____ 302—53
2,735,725   2/1956   Galle _____ 302—52

FOREIGN PATENTS 885,525   12/1961   Great Britain.

SAMUEL F. COLEMAN, *Primary Examiner.*

ANDRES H. NIELSEN, *Assistant Examiner.*